United States Patent
Guiard et al.

(10) Patent No.: US 9,517,742 B2
(45) Date of Patent: Dec. 13, 2016

(54) SHOCK ABSORBER MEMBER FOR VEHICLE, VEHICLE DOOR PANEL ASSEMBLY INCLUDING SHOCK ABSORBER MEMBER AND VEHICLE INCLUDING DOOR PANEL ASSEMBLY

(75) Inventors: Christophe Guiard, Bangkok (TH); Vinicius Nogueira, Lauro de Freitas (BR); Vineet Kedia, Maharashtra (IN); Rao Nuthalapati, Rochester Hills, MI (US)

(73) Assignee: FAURECIA INTERIOR SYSTEMS INDIA PVT. LTD., Maharashtra State (IN)

( * ) Notice: Subject to any disclaimer, the term of this patent is extended or adjusted under 35 U.S.C. 154(b) by 0 days.

(21) Appl. No.: 14/415,989

(22) PCT Filed: Jul. 23, 2012

(86) PCT No.: PCT/IN2012/000515
§ 371 (c)(1),
(2), (4) Date: Jun. 22, 2015

(87) PCT Pub. No.: WO2014/016843
PCT Pub. Date: Jan. 30, 2014

(65) Prior Publication Data
US 2015/0291117 A1  Oct. 15, 2015

(51) Int. Cl.
*B60R 21/04* (2006.01)
*F16F 7/12* (2006.01)
*B29C 45/00* (2006.01)
*B60J 5/04* (2006.01)
*E06B 5/00* (2006.01)
(Continued)

(52) U.S. Cl.
CPC ....... *B60R 21/0428* (2013.01); *B29C 45/0025* (2013.01); *B60J 5/042* (2013.01); *B60J 5/0412* (2013.01); *E06B 5/00* (2013.01); *F16F 7/12* (2013.01); *B29C 2045/0034* (2013.01); *B29K 2101/12* (2013.01); *B29L 2031/3041* (2013.01)

(58) Field of Classification Search
CPC ................ B60J 5/0451; B60R 21/0428; B60R 2021/0055; B60R 2021/0414
USPC ................ 296/146.6, 187.05, 187.12, 146.7
See application file for complete search history.

(56) References Cited

U.S. PATENT DOCUMENTS 4,769,951 A * 9/1988 Kaaden .................. B60J 5/0405
296/146.6
6,729,425 B2 * 5/2004 Schneider ............ B62D 29/002
180/68.5
(Continued)

FOREIGN PATENT DOCUMENTS

CN 201484142 U 5/2010
GB 2392650 A 3/2004

OTHER PUBLICATIONS

International Search report and Written Opinion for related International Application PCT/IN2012/000515; report dated on Jul. 4, 2013.

*Primary Examiner* — Pinel Romain
(74) *Attorney, Agent, or Firm* — Miller, Matthias & Hull LLP

(57) ABSTRACT

A vehicle door panel shock absorber having a outer wall and first and second reinforcing wings each extending between two opposite ends which are unitary with the outer wall, the first and second reinforcing wings crossing themselves at a center inside the outer wall and being unitary with one another at this center.

14 Claims, 4 Drawing Sheets

(51) Int. Cl.
*B29K 101/12* (2006.01)
*B29L 31/30* (2006.01)

(56) References Cited

U.S. PATENT DOCUMENTS

| | | | | |
|---|---|---|---|---|
| 8,096,604 | B2* | 1/2012 | Asenkerschbaumer | B60J 5/043 296/146.6 |
| 8,118,347 | B2* | 2/2012 | Kawashima | B60R 21/04 296/187.05 |
| 8,152,218 | B2* | 4/2012 | Hall | B60J 5/0451 296/146.6 |
| 8,960,774 | B2* | 2/2015 | Sakhare | B62D 25/02 280/748 |
| 9,114,773 | B2* | 8/2015 | Sundararajan | B60R 21/0428 |
| 2009/0278380 | A1 | 11/2009 | Bhattacharjee et al. | |
| 2010/0201112 | A1 | 8/2010 | Subbian et al. | |
| 2015/0115585 | A1* | 4/2015 | Smith | B60R 21/0428 280/751 |

* cited by examiner

SHOCK ABSORBER MEMBER FOR VEHICLE, VEHICLE DOOR PANEL ASSEMBLY INCLUDING SHOCK ABSORBER MEMBER AND VEHICLE INCLUDING DOOR PANEL ASSEMBLY

CROSS-REFERENCE TO RELATED APPLICATION

This Application is a 35 USC §371 US National Stage filing of International Application No. PCT/IN2012/000515 filed on Jul. 23, 2012.

FIELD OF THE INVENTION DISCLOSURE

The present invention relates to a shock absorber member for vehicle, to a vehicle door panel assembly including such a shock absorber member and to a vehicle including such an assembly.

BACKGROUND OF THE DISCLOSURE

Shock absorber members are used, for instance in vehicle doors, to absorb shocks occurring during a collision. Collisions, notably side collision, are one of the most severe accidents that can occur. While the accident can be harmful for both vehicles involved, typically the driver or passenger who is struck has a high chance of suffering from severe injuries and damages. That is why in the recent times big efforts have been made to create an effective solution of this problem, in particular, internal vehicle door panels shock absorber members have been provided in the lower section of a vehicle door for protecting the lower body section of the passenger or driver during a lateral vehicle crash.

EP0718161B1 describes an internal vehicle door panels shock absorber member, where energy absorbing bolsters in the form of foam blocks are placed between the inner and outer panels of the door. One disadvantage of these foam blocks is that for increasing protection, the foam blocks need to be thicker, i.e. having a bigger dimension in the transversal direction of the vehicle (in the present application, this transversal dimension will be called "height"), so that the inner space of the occupant is reduced. One other disadvantage is that the energy absorption is linear along the height, so that the energy absorption rate cannot vary along the height.

The present invention has notably for object to mitigate this drawback.

SUMMARY OF THE DISCLOSURE

To this aim, according to one aspect of the invention, it is provided a shock absorber member for vehicle comprising:
  an outer wall having an inside surface and an outside surface, said outer wall extending on a predetermined height from a first to a second edges along a height direction,
  at least a reinforcing wing extending longitudinally between two opposite ends which are unitary with the inside surface of the outer wall, said reinforcing wing extending transversally along the height direction from a first to a second edges and having a width between said first and second edges which is inferior to the predetermined height of the outer wall at the ends of said wings, characterized in that said first and second edges of the reinforcing wing are respectively arranged at a distance of said first and second edges of the outer wall;

With this feature, it is provided a simple shock absorber member, where the energy absorption rate vary along the height direction of the shock absorber member and which can be easily adjusted to the needs e.g. by choosing an adapted distance between said first and second edges of the reinforcing wings to said first and second edges of the outer wall. In addition, as the shock absorber member is able to vary its energy absorption rate along the height direction, a thinner shock absorber member is use compare to prior art type of shock absorber member which makes the invention more compact.

In some embodiments, one might also use one or more of the following features taken alone or in combination:
  said shock absorber member is an injection-molded thermoplastic part;
  This feature makes the shock absorber member simple to manufacture.
  said outer wall has a thickness which varies along the height direction thereof;
  This feature enables to adjust the energy absorption rate of the shock absorber member all along the height.
  said reinforcing has a thickness which varies along the height direction thereof.
  This feature enables to adjust the energy absorption rate of the shock absorber member between the first and second edges of the reinforcing wing.
  a plurality of reinforcing wings are extending longitudinally between two opposite ends which are unitary with the outer wall, each of said plurality of reinforcing wings extending transversally along the height direction from a first to a second edges and having a width between said first and second edges which is inferior to the predetermined height of the outer wall at the ends of said wings, and are crossing themselves while being integral one with the others.
  This feature enables to further adjust the energy absorption rate of the shock absorber member between the first and second edges of the reinforcing wings.
  the height of at least two different reinforcing wings are different one from the other.
  Advantageously, this feature enables to further adjust the energy absorption rate of shock absorber member between the first and second edges of the reinforcing wings.
  the shock absorber member is made in a mold having a first and a second part defining between them a cavity when first and second part are in contact, so as to define a split line on the molded part between a first portion coming from the first part of the mold and a second portion coming from the second part of the mold, said split line being arranged at a distance of said first and second edge of the outer wall.
  said split line is arranged at a distance of the first and second edge of the outer wall comprised between one third and two third of the total height, and preferably in the middle of the total height.
  These features, advantageously improve the moldability of such a shock absorber member. Indeed, it improved the filing of thermoplastic material inside the cavity. Additionally, it improves the thermal regulation of the thermoplastic material inside the cavity along the height direction.
  said outer wall has constant thickness between said first edge and the split line and decreasing from the split line to the second edge.

said reinforcing wing has a thickness increasing between said first edge and the split line and decreasing from the split line to the second edge.

Theses features advantageously increase the un-molding angle so that it improves the ability of the shock absorber member to be removed easily from the cavity.

Besides, another object of the invention is a vehicle door panel assembly including:
a vehicle door panel,
and at least one shock absorber member according to any one of the preceding claims, said shock absorber member being unitary with said vehicle door panel and said height of the outer wall of said shock absorber member being substantially perpendicular to said vehicle door panel;

Advantageously, this feature reduces the number of part comprised in such a vehicle door panel assembly.
said vehicle door panel includes a main carrier and an inner carrier borne by said main carrier, said shock absorber member being borne by said inner carrier;

Advantageously, only one tool is used to manufacture the inner carrier and the shock absorber member. This feature helps to reduce manufacturing cost.
said main carrier is covering at least the shock absorber member;

Still another object of the invention is a vehicle having at least one door fitted with a vehicle door panel assembly as defined above and a seat in correspondence with said door, wherein said shock absorber member is disposed inside the door, in correspondence with a normal position of the pelvis of a user (U) seated on said seat. This feature, provide advantageously an improved side protection to user using such a vehicle when having a side collision while having a compact vehicle door panel.

BRIEF DESCRIPTION OF THE DRAWINGS

Other characteristics and advantages of the invention will readily appear from the following description of one of its embodiments, provided as non-limitative examples, and of the accompanying drawings.

On the drawings.

DETAILED DESCRIPTION OF THE DISCLOSURE

On the different Figures, the same reference signs designate like or similar elements.

Figure 1:
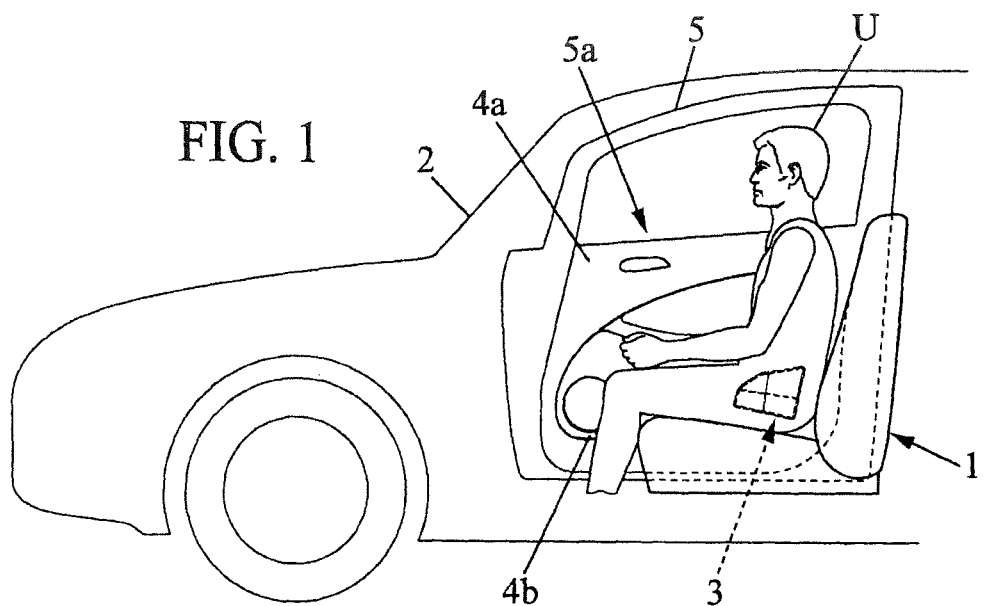
FIG. 1 is a diagrammatic view of a vehicle provided with one example of a door panel shock absorber member according to one embodiment of the invention.
Figure 2:
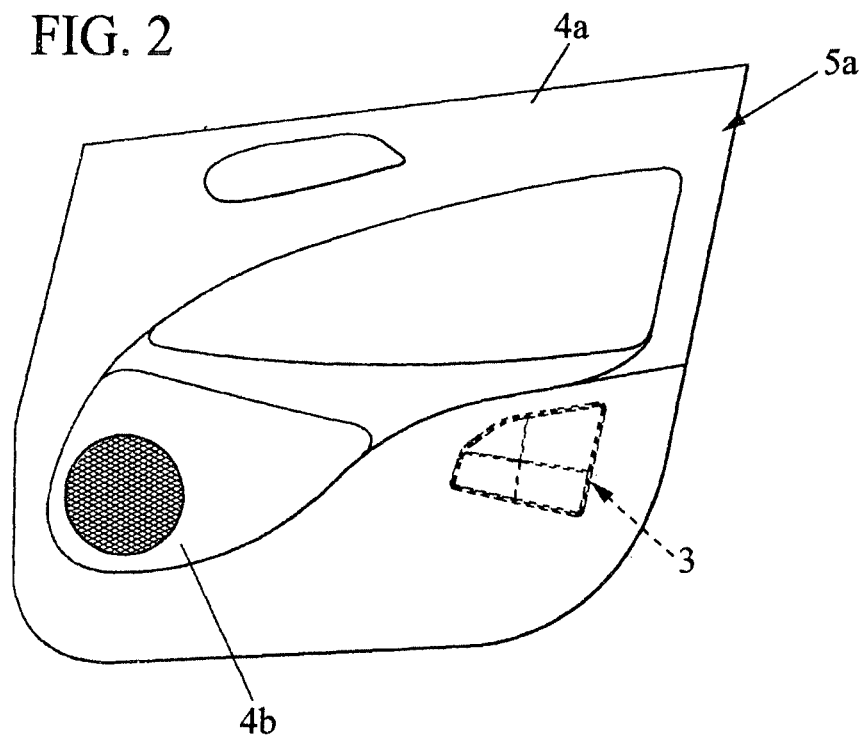
FIG. 2 is a front view from the inside of a vehicle door panel assembly including the impact absorber of FIG. 1, FIGS. 3 and 4 are perspective views of part of the door panel assembly of FIG. 2, viewed respectively from the back and from the front.

FIG. 1 shows a user U sitting on a seat 1 of a vehicle 2. The door 5 of the vehicle, which is in correspondence with this seat 1, has a door panel shock absorber member 3 which is indicated with dashed lines on FIG. 1 but is more clearly visible on FIGS. 2-6. This shock absorber member is situated in correspondence with the pelvic area of the user so that during a side collision, the pelvic area of the user is protected by this shock absorber member. The shock absorber member 3 is belonging to a vehicle door panel assembly 5a which is mounted inside the door 5 of the vehicle and which is more clearly visible on FIG. 2.

This vehicle door panel assembly 5a includes:
a main carrier 4a,
and an inner carrier 4b borne by said main carrier, said shock absorber 3 being borne by said inner carrier.

The shock absorber member 3 may for instance be injection molded as one single part with the inner carrier 4b, for instance in thermoplastic material. The inner carrier 4b and shock absorber 3 may be fixed to the main carrier 4a by any means, for instance by screws or rivets, or else.

As seen on FIGS. 2-6, the shock absorber 3 includes:
an outer wall 6 having an inside surface and an outside surface, said outer wall extending on a certain height between first and second edges (6a, 6b) along a height direction,
at least first and second reinforcing wings 7,11 each extending between two opposite ends which are unitary with the outer wall 6, each of said first and second reinforcing wings extending on a certain height parallel to the height of the outer wall 6 between a first and second edges (7a, 11a; 7b, 11b), each of said first and second edges (7a, 11a; 7b, 11b) of said first and second reinforcing wings are facing respectively first and second edges (6a, 6b) of said outer wall 6, said first and second reinforcing wings crossing themselves perpendicularly to one another at a center 8 inside the outer wall and being unitary with one another at said center.

Figure 3:
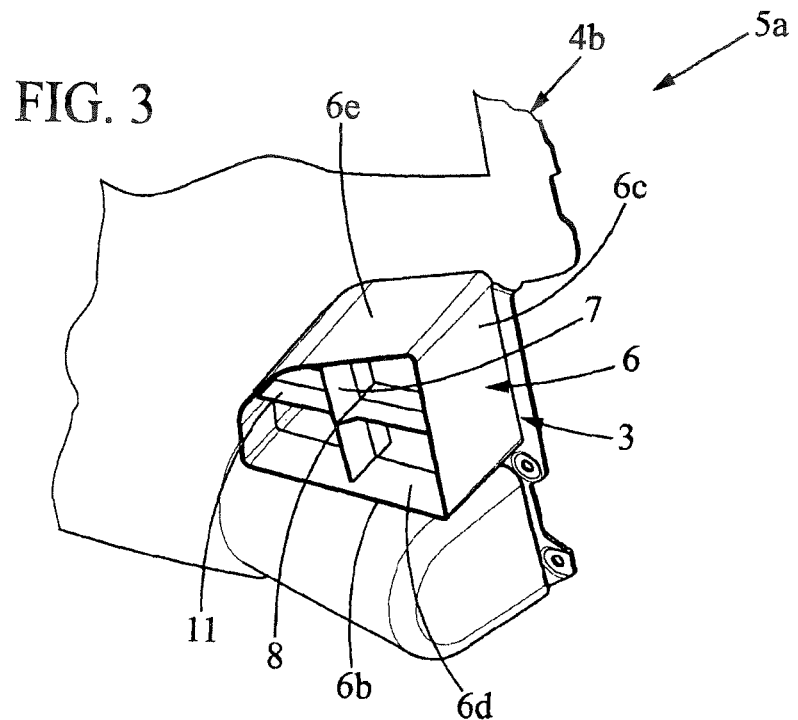
Figure 4:
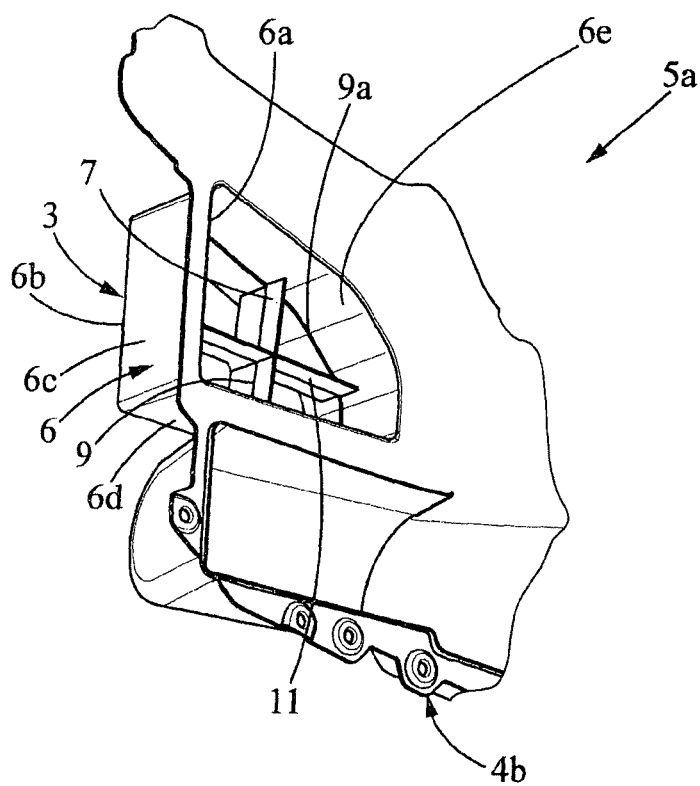

The outer wall may have for instance substantially the general shape of a triangle, with two flat sides 6c, 6d which are substantially perpendicular to one another and a curved side 6e (see FIGS. 3 and 4).

In the particular example shown on the drawings, and as more clearly visible on FIG. 3-6, the inner wings 7, 11 may have different heights and the heights of both of the wings may be lower than the height of the outer wall.

More precisely, in the present example, the height of the wing 7, which is connecting the longest flat side 6d and the curved side 6e, is larger than the wing 11, which is connecting the shorter flat side 6c and the curved side 6e (except at the crossing point 8, where wing 7 has locally a larger height which is equal to that of wing 11).

Further, in the example shown on the drawings:
the edges (7a, 11a) of wings 7, 11 which are closer to the first edge 6a of the outer wall 6, are comprised in a common plane but offset from the plane of the first edge 6a in the direction of the second edge 6b of the outer wall 6;
the edges (7b, 11b) of wings 7, 11 which are closer to the second edge 6b of the outer wall 6, are not at the same level except at the crossing point 8 and are offset from the plane of the second edge 6b in the direction of the first edge 6a of the outer wall 6.

The integrated door panel shock absorber is able to be fitted into a space which has a height of at most 100 mm, between the door panel 5a and the inner metal sheet of the vehicle door 5.

Figure 7:
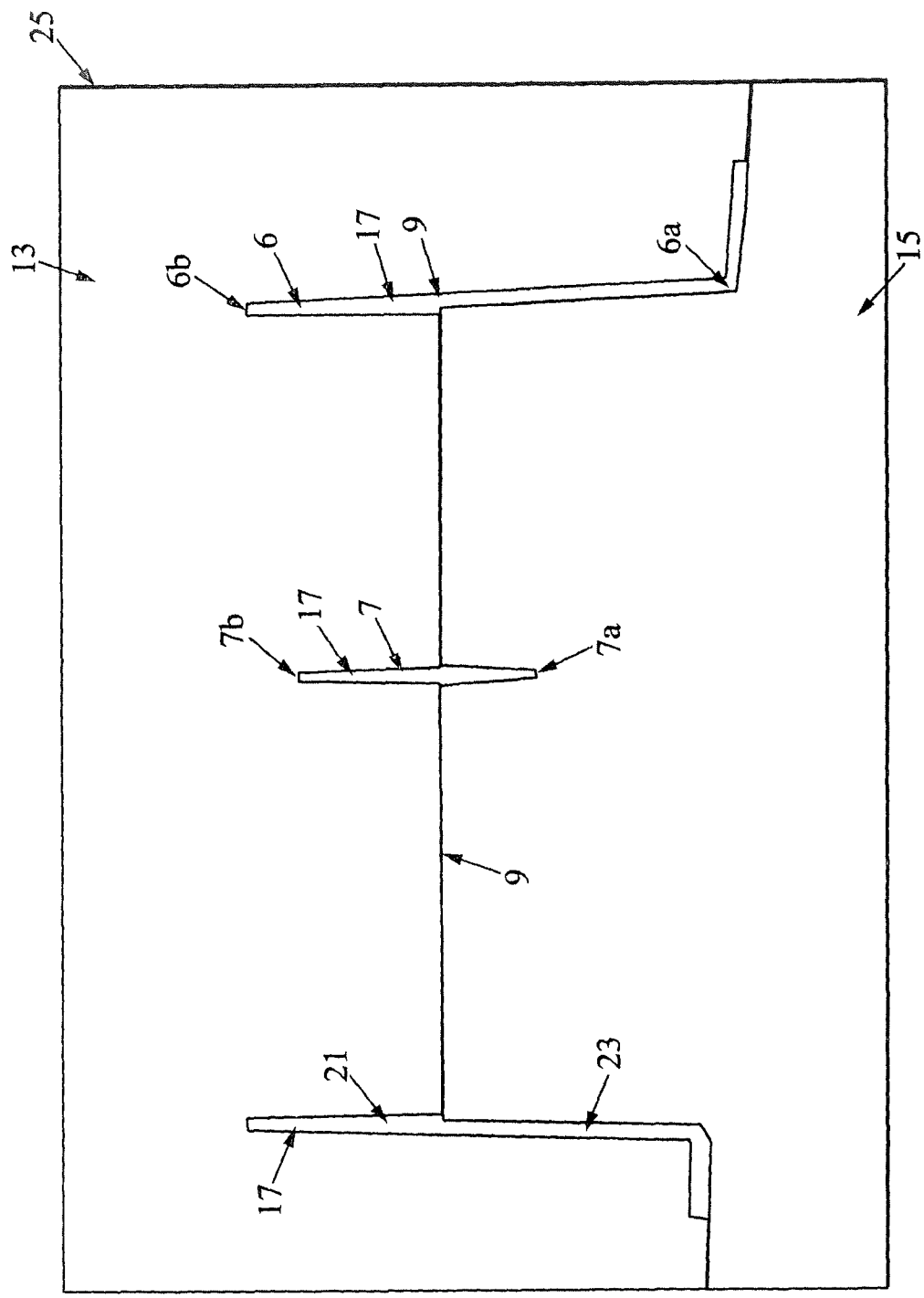
FIG. 7 is cross sectional view of the mold in the region of the shock absorber member.

FIG. 7 is a diagrammatic view of a mold 25 able to manufacture by injection molding the shock absorber member 3. The mold 25 comprises a first 13 and a second 15 part defining between them a cavity 17 when first 13 and second 15 parts are in contact. When in contact, first 13 and second 15 define, a split line 9 which define on the molded part the border between a first portion 21 coming from the first part 13 of the mold and a second portion 23 coming from the second part 15.

The split line 9 is arranged at a distance of said first 6a and second 6b edge of the outer wall. Typically the split line 9 is arranged at a distance of the first 6a and second 6b edge of the outer wall 6 comprised between one third and two third of the height of the outer wall 6, and preferably in the middle.

Figure 5:
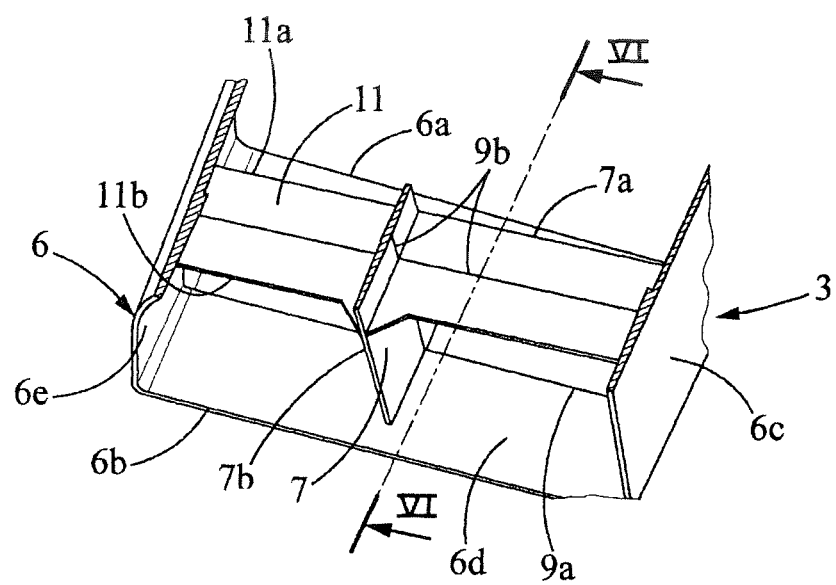
FIG. 5 is cross-sectional view of the shock absorber, the cross section being taken in the plane V-V of FIG. 6.
Figure 6:
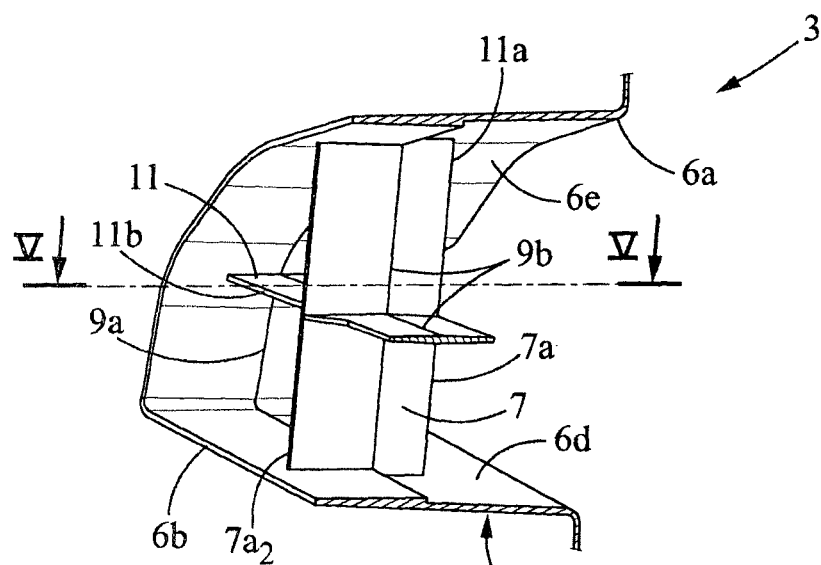
FIG. 6 is cross-sectional view of the shock absorber member, the cross section being taken in the plane VI-VI of FIG. 5.

As best seen on FIGS. 5, 6, the outer wall 6 and the wings 7, 11 may have a thickness which varies along the height thereof. In particular, in the example considered here, the outer wall 6 may have a larger thickness in the part thereof which is closer to the first edge 6a, and a lower thickness in the part thereof which is closer to the second edge 6b, these two parts being separated by the split line 9 visible on the drawings. Further, in the example considered here, the thickness of the wings 7, 11 is maximum in a central plane corresponding to the split lines 9, and diminish toward each edge of the wings.

As best shown on FIGS. 5 and 6 the outer wall 6 has constant thickness between said first edge 6a and the split line 9 and decreasing from the split line 9 to the second edge 6b. Additionally, in the example considered here the reinforcing wings 7,11 have a thickness increasing between said first edge 7a, 11a and the split line 9 and decreasing from the split line 9 to the second edge 7b,11b.

When crushing, in case of side collision, the shock absorber member 3 starts crushing at a first energy absorption rate between the second edge 6b of the outer wall and the second highest second edge (7b, 11b) of the reinforcing wings. Then the shock absorber member 3 continues to crush at a second energy absorption rate between the highest second edge (7b, 11b) of reinforcing wings and lowest first edge (7a, 11a) of reinforcing wings, the second energy absorption rate being superior to the first. Finally, the shock absorber member 3 ends its crush at a third energy absorption rate between the lowest first edge (7a, 11a) of the reinforcing wing and the first edge 6a of the outer wall 6, the third energy absorption rate being lower than the second and may be higher or lower than the first energy absorption rate depending on the energy absorption needs.

The above varying thicknesses help the outer wall and wings to better resist in case of a side collision and to fine tune the energy absorption rate, so as to bend but not to break and thus transform the impact force of the crash into deformation energy so that the plastic material can absorb the impact and as a result to protect the passengers, especially in the pelvic area.

The integrated vehicle door panel absorber for usage in automotive doors is made from thermoplastic material. Therefore, when compared with former structures composed from inner metal door panel with plastic or foam pads, it is lighter and simpler to mount. As a result, working time can be spared when assembling the door panel and the productivity may be increased.

The invention claimed is:

1. A shock absorber member for vehicle comprising:
   an outer wall having an inside surface and an outside surface, said outer wall extending on a predetermined height from a first to a second edges along a height direction,
   at least a reinforcing wing extending longitudinally between two opposite ends which are unitary with the inside surface of the outer wall, said reinforcing wing extending transversally along the height direction from a first to a second edges and having a width between said first and second edges which is inferior to the predetermined height of the outer wall at said ends of said wing,
   wherein the first edge of said wing is offset from the first edge of the outer wall at said ends of the wing in the direction of the second edge and the second edge of said wing is offset from the second end of the outer wall at said ends of the wing in the direction of the first edge, and
   wherein the width between said first and second edges increases towards the center of said wing.

2. The shock absorber member for vehicle according to claim 1, wherein said shock absorber member is an injection-molded thermoplastic part.

3. The shock absorber member for vehicle according to claim 1, wherein said outer wall has a thickness which varies along the height direction thereof.

4. The shock absorber member for vehicle according to claim 1, wherein said reinforcing wing has a thickness which varies along the height direction thereof.

5. The shock absorber member for vehicle according to claim 4, wherein a plurality of reinforcing wings are extending longitudinally between two opposite ends which are unitary with the outer wall, each of said plurality of reinforcing wings extending transversally along the height direction from a first to a second edges and having a width between said first and second edges which is inferior to the predetermined height of the outer wall at the ends of said wings, and are crossing themselves while being integral one with the others.

6. The shock absorber member for vehicle according to claim 5, wherein the height of at least two different reinforcing wings are different one from the other.

7. The shock absorber member for vehicle according to claim 1, wherein the shock absorber member is made in a mold having a first and a second part defining between them a cavity when first and second part are in contact, so as to define a split line which define on the molded part the border between a first portion coining from the first part of the mold and a second portion coming from the second part of the mold, said split line being arranged at a distance of said first and second edge of the outer wall.

8. The shock absorber member for vehicle according to claim 7 wherein said split line is arranged at a distance of the first and second edge of the outer wall comprised between one third and two third of the total height, and preferably in the middle of the total height.

9. The shock absorber member for vehicle according to claim 7, wherein said outer wall has constant thickness between said first edge and the split line and decreasing from the split line to the second edge.

10. The shock absorber member for vehicle according to claim 7, wherein said reinforcing wing has a thickness increasing between said first edge and the split line and decreasing from the split line to the second edge.

11. A vehicle door panel assembly including:
    a vehicle door panel,
    and at least one shock absorber member according to any one of the preceding claims, said shock absorber member being unitary with said car door panel and said height of the outer wall of said shock absorber member being substantially perpendicular to said vehicle door panel.

12. The vehicle door panel assembly according to claim 11, wherein said vehicle door panel includes a main carrier and an inner carrier borne by said main carrier, said shock absorber member being borne by said inner carrier.

13. The vehicle door panel assembly according to claim 12, wherein said main carrier is covering at least the shock absorber member.

14. The vehicle having at least one door fitted with a vehicle door panel assembly according to claim 11 and a seat in correspondence with said door, wherein said shock absorber member is disposed inside the door, in correspondence with a normal position of the pelvis of a user seated on said seat.

* * * * *